Patented Oct. 4, 1938

2,132,351

UNITED STATES PATENT OFFICE 2,132,351

STABLE AQUEOUS SOLUTIONS OF SUBTANCES HAVING AN ANESTHETIC EFFECT

Eugen Dörzbach and Viktor Bross, Frankfort-on-the-Main-Hochst, Germany, assignors to Winthrop Chemical Company, Inc., New York, N. Y., a corporation of New York No Drawing. Application November 11, 1935, Serial No. 49,324. In Germany July 14, 1934

9 Claims. (Cl. 167—52)

The present invention relates to stable aqueous solutions of substances having an anesthetic effect, more particularly to stable aqueous solutions which, besides the anesthetic agent, contain all salts occurring in the blood.

The commercial solutions of substances having an anesthetic effect mostly contain inorganic or organic salts in varying amounts, besides the anesthetic and a vasoconstricting agent. Though these salts may be found in the human and animal blood-serum, it was impossible up to the present day to produce stable solutions of substances having an anesthetic effect, which contain all the salts occurring in the blood, namely potassium sulfate, potassium chloride, sodium chloride, sodium bicarbonate, calcium chloride, magnesium chloride and sodium phosphate. This is due to the fact that hitherto it was impossible to prepare stable solutions of blood salts without the aid of colloidal substances, because the calcium ions soon react with the carbonate ions and phosphate ions with formation of precipitates or turbidities.

Now we have found that when adding all the salts contained in the blood to the commercial solutions of a compound of the class of aminobenzoic acid-alkamine-esters having an anesthetic effect, clear solutions are obtained which, even after a prolonged time, show no turbidities. If the process is carried out by first dissolving the blood salts in water, waiting for the precipitations to occur and then adding the anesthetic, the precipitate completely dissolves. Obviously the anesthetics together with the calcium salts yield molecular compounds the solutions of which are stable to carbonate ions and phosphate ions.

The observation leads to a process for obtaining solutions of substances having an anesthetic effect which have the same ions as the blood serum. By using suitable amounts of the various components it is possible to adjust the isoionic solutions of substances having an anesthetic effect obtainable according to the present invention to the osmotic pressure of the blood plasma; the hydrogen ion concentration may vary. There may be added to the solutions vasoconstrictors such as dihydroxyphenylethanolmethylamine or other substances having a similar effect, for instance, the 3.4-dihydroxyphenylpropanolamine or the 3.4-dihydroxyphenyl-alpha-ethanolamine. Furthermore stabilizing agents may be added to the solutions. It may also be advantageous to add to the solutions such physiologically indifferent substances as increase the viscosity of the solution in order to adjust it to the viscosity of the blood serum. As such a substance which raises the viscosity there may be applied the oxyethyl methyl cellulose.

The following examples serve to illustrate the invention, but they are not intended to limit it thereto:

(1) 2 grams of the hydrochloride of the para-aminobenzoic acid-diethylaminoethylester, 7 mg. of potassium sulfate, 32 mg. of potassium chloride, 400 mg. of sodium chloride, 100 mg. of glucose, 234 mg. of sodium bicarbonate, 30 mg. of calcium chloride, 11 mg. of magnesium chloride and 7.5 mg. of secondary sodium phosphate are dissolved in water so as to form 100 grams in all. The solution is isoionic and isotonic with respect to the blood serum.

(2) 2 grams of the hydrochloride of the para-aminobenzoic acid diethylaminoethylester, 20 mg. of the hydrochloride of ortho-dihydroxyphenyl-propanolamine, 250 mg. of oxyethylmethyl-cellulose, 32 mg. of potassium chloride, 280 mg. of sodium chloride, 100 mg. of glucose, 30 mg. of calcium chloride, 11 mg. of magnesium chloride, 230 mg. of sodium bicarbonate, 3 mg. of secondary sodium phosphate, 4 mg. of primary sodium phosphate and 7 mg. of potassium sulfate are dissolved in water so as to form 100 grams in all. The solution is isoionic and isotonic with regard to the blood serum and shows the same viscosity as the blood serum.

(3) 2 grams of the hydrochloride of the para-aminobenzoic acid diethylaminoethylester, 20 mg. of the hydrochloride of orthodihydroxyphenyl-propanolamine, 250 mg. of oxyethylmethyl cellulose, 32 mg. of potassium chloride, 280 mg. of sodium chloride, 100 mg. of glucose, 30 mg. of calcium chloride, 11 mg. of magnesium chloride, 230 mg. of sodium bicarbonate, 7.5 mg. of secondary sodium phosphate, 7 mg. of potassium sulfate and 100 gamma of stearolic acid are dissolved in water so as to form 100 grams in all.

(4) 0.5 gram of N-hexyl-anthranilic acid-beta-diethyl-aminoethylamide-phosphate (prepared by heating to 200° C. equal parts by weight of N-hexylanthranilic acid ethylester and 1-amino-2-diethylamino-ethane and distilling the basic amide under reduced pressure), 2 mg. of the hydrochloride of ortho-dihydroxyphenylethanol-methylamine, 250 mg. of oxyethylmethyl cellulose, 32 mg. of potassium chloride, 630 mg. of sodium chloride, 100 mg. of glucose, 30 mg. of calcium chloride, 11 mg. of magnesium chloride, 230 mg. of sodium bicarbonate and 7 mg. of potassium sulfate are dissolved in water so as to form 100 grams in all. The solutions are completely stable even at body temperature.

We claim:

1. A stable aqueous solution containing an anesthetic selected from the group consisting of amino-benzoic acid-alkamine-esters and potassium-, sodium-, calcium- and magnesium-cations as well as sulfuric acid-, hydrochloric acid-, carbonic acid- and phosphoric acid anions.

2. A stable aqueous solution containing an anesthetic selected from the group consisting of amino-benzoic acid-alkamine-esters, potassium-, sodium-, calcium- and magnesium-cations as well as sulfuric acid-, hydrochloric acid-, carbonic acid- and phosphoric acid anions and a vasoconstrictor.

3. A stable aqueous solution containing an anesthetic selected from the group consisting of amino-benzoic acid-alkamine-esters, potassium-, sodium-, calcium- and magnesium-cations as well as sulfuric acid-, hydrochloric acid-, carbonic acid- and phosphoric acid anions, a vasoconstrictor and a physiologically indifferent substance raising the viscosity of the solution.

4. A stable aqueous solution containing N-hexyl-anthranilic acid-beta-diethylaminoethyl-amide-phosphate and potassium-, sodium-, calcium- and magnesium-cations as well as sulfuric acid-, hydrochloric acid-, carbonic acid- and phosphoric acid anions.

5. A stable aqueous solution containing the hydrochloride of para-aminobenzoic acid diethylaminoethylester and potassium-, sodium-, calcium- and magnesium-cations as well as sulfuric acid-, hydrochloric acid-, carbonic acid- and phosphoric acid anions.

6. A stable aqueous solution containing the hydrochloride of para-aminobenzoic acid diethylaminoethyl ester, potassium-, sodium-, calcium- and magnesium-cations as well as sulfuric acid-, hydrochloric acid-, carbonic acid- and phosphoric acid anions and a vasoconstrictor.

7. A stable aqueous solution containing the hydrochloride of para-aminobenzoic acid diethylaminoethyl ester, potassium-, sodium-, calcium- and magnesium-cations as well as sulfuric acid-, hydrochloric acid-, carbonic acid- and phosphoric acid anions, a vasoconstrictor and a physiologically indifferent substance raising the viscosity of the solution.

8. A stable aqueous solution containing 2% of the hydrochloride of para-aminobenzoic acid diethylaminoethyl ester, 0.007% of potasium sulfate, 0.032% of potassium chloride, 0.4% of sodium chloride, 0.1% of glucose, 0.234% of sodium bicarbonate, 0.03% of calcium chloride, 0.011% of magnesium chloride, 0.0075% of secondary sodium phosphate and a vasoconstrictor.

9. A stable aqueous solution containing 2% of the hydrochloride of para-aminobenzoic acid diethylaminoethyl ester, 0.007% of potassium sulfate, 0.032% of potassium chloride, 0.28% of sodium chloride, 0.02% of the hydrochloride of orthodihydroxyphenylpropanolamine, 0.25% of oxyethylmethyl cellulose, 0.1% of glucose, 0.234% of sodium bicarbonate, 0.03% of calcium chloride, 0.011% of magnesium chloride, 0.003% of secondary sodium phosphate, 0.004% of primary sodium phosphate and a vasoconstrictor.

EUGEN DÖRZBACH.
VIKTOR BROSS.